Feb. 7, 1950    H. S. WERTZ    2,496,970
CATHODE-RAY TUBE CIRCUIT
Filed Aug. 26, 1947    2 Sheets-Sheet 1
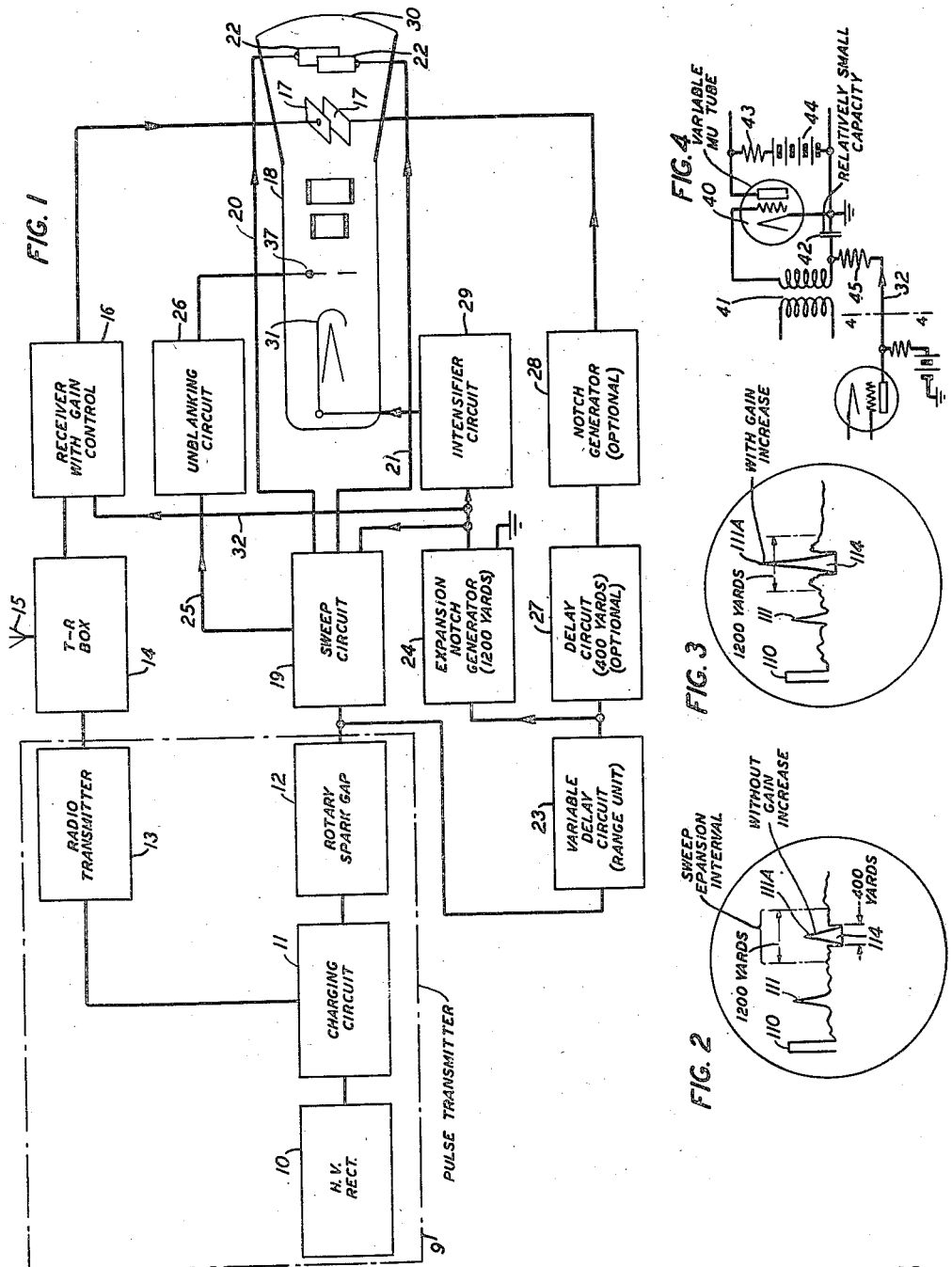
INVENTOR
H. S. WERTZ
BY
G. H. Heydt
ATTORNEY

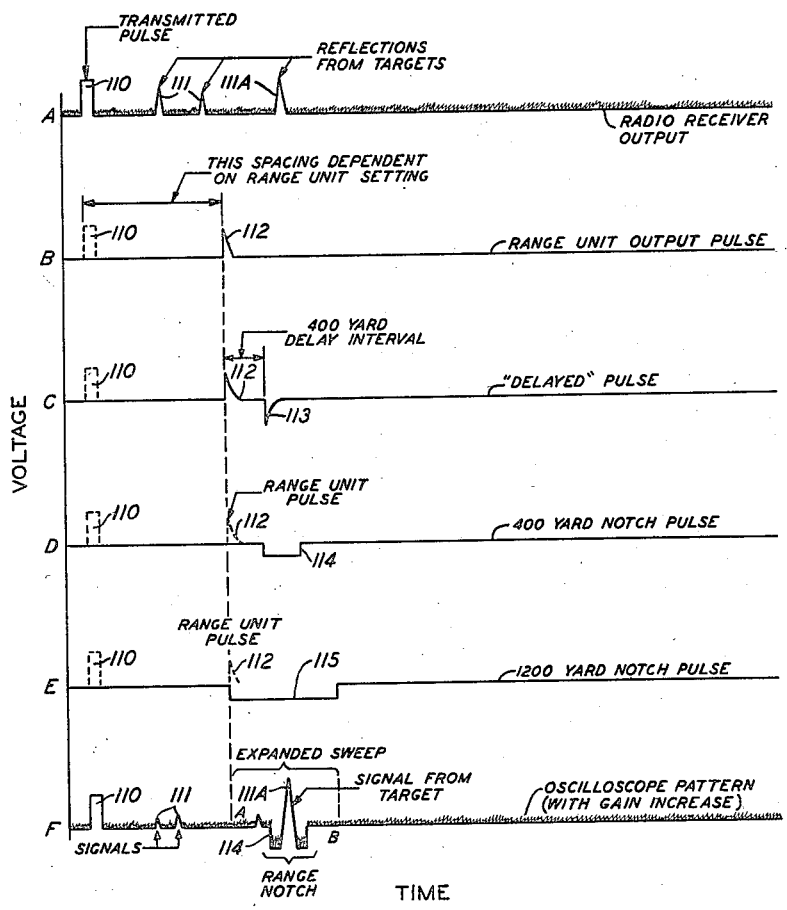

Patented Feb. 7, 1950

2,496,970

UNITED STATES PATENT OFFICE 2,496,970

CATHODE-RAY TUBE CIRCUIT

Hugh S. Wertz, Manhasset, N. Y., assignor to Bell Telephone Laboratories, Incorporated, New York, N. Y., a corporation of New York Application August 26, 1947, Serial No. 770,653

4 Claims. (Cl. 315—24)

1

This invention relates to an indicating system and particularly to an indicating system employing a cathode ray tube.

The use of a cathode ray tube as an indicating or viewing device is well known in the art. In a typical arrangement, the cathode ray beam generated in the tube is deflected by means of a varying voltage, called the sweep voltage, applied to one set of deflection elements so that it sweeps at a known rate over a predetermined path on a screen or target to provide a linear time scale or axis and the signals, a visual indication of which is desired on said screen, are applied to a second set of deflection elements in such manner as to cause transverse deflections of the beam from its normal path. This disposition of the latter deflections along a normal path as displayed on the screen indicates the time intervals existing between the signals, and the width of each signal image indicates its time duration.

In order that individual signals or restricted portions of the time scale of the cathode ray indicator tube may be closely observed, it is necessary in general to expand the scale beyond the available range of the screen. As a result of such sweep expansion, much of the total sweep range would be lost from view. To prevent this undesirable result, it has been heretofore proposed to expand a portion only of the timing scale of an indicating circuit employing a cathode ray indicator tube. In Patent 2,416,320, issued February 25, 1947, to P. A. Jeanne, there is disclosed a circuit arrangement employing a cathode ray indicator tube in which the timing scale is expanded and the beam of the cathode ray tube intensified during a predetermined portion of the complete sweep period. In a specific example disclosed in the Jeanne patent, the period of expansion is that corresponding to a range of 1200 yards when the oscilloscope is used in connection with a radar system. The present invention relates to an improvement in cathode ray indicating systems of the general type disclosed in the Jeanne patent although it is to be understood that the invention is not limited to use with cathode ray oscilloscopes used as part of radar systems.

It is an object of this invention to accentuate (in connection with oscilloscopes of the type in which a portion only of the timing scale is expanded) that portion of the visual indication on the screen formed during the time period that the scale is expanded with respect to the other portions of the visual indication.

It is another object of this invention to in-

2 crease the gain of a part only of a repetitive signal train a visual indication of which is to be observed on the screen of a cathode ray tube.

It is still another object of this invention to increase the gain of a portion of a signal train applied to one of two sets of cathode ray deflecting means arranged to produce deflections at right angles to one another at the same time that the timing wave applied to the other set of deflecting means is expanded.

In accordance with a specific embodiment of the invention, chosen by way of example for purposes of illustration, there is provided a cathode ray oscillograph arrangement including a cathode ray tube and circuits associated therewith for producing an enlarged signal during an expanded sweep period. The circuits associated with the cathode ray tube comprise, among others, a sweep circuit (which may be, for example, of the type disclosed in detail in the above-identified Jeanne patent for producing expansion of the timing scale for an interval of time corresponding to the length of a controlling pulse), and circuit means for increasing the gain of the signal which is applied to the set of deflecting means other than that to which the sweep circuit is connected. This latter circuit means includes at least one variable-mu tube forming part of an amplifier of the signal or signals to be represented on the screen of the cathode ray tube. This variable-mu tube has a condenser of relatively small capacity in its input circuit across which is applied the controlling pulse to increase the gain of the receiver during the period of this pulse. As the time constant of this condenser and of a resistance connected in one lead thereto is very short, a very rapid change of gain takes place during the relatively short time periods required to form the leading and trailing edges of the controlling pulse. If desired, the intensity of the beam for the duration of this controlling pulse can be increased as in the arrangement disclosed in the Jeanne patent. The effect of the circuit arrangement of this invention is to produce on the screen of the cathode ray tube, assuming that it is used as an oscilloscope, a trace in one portion of which the signals are increased in height above the base line with respect to another portion thereof and this is true even though a "notch" pulse, the normal effect of which would be to decrease the height of the signal occurring during the notch with respect to the rest of the visual indication of the signal, is also applied to the deflecting means to which the signals are applied.

The invention will be more readily understood by referring to the following description taken in connection with the accompanying drawings forming a part thereof in which:

Fig. 1 is a schematic block diagram of an indicating system in accordance with the invention;

Figs. 2 and 3 are diagrammatical representations to aid in understanding the invention;

Fig. 4 is a circuit diagram of a portion of the receiver in the system shown in Fig. 1; and Fig. 5 is a series of diagrammatical representations to aid in understanding the invention.

Referring more specifically to the drawings, Fig. 1 shows, by way of example for illustrative purposes, a radar system employing an indicating arrangement in accordance with the invention. Fig. 1 is a single line block diagram to show the relationship of the various major elements of the system and is not intended to be a circuit diagram. In the arrangement of Fig. 1, a high voltage rectifier 10 in a radar pulse transmitter 9 supplies about 12,000 volts direct current to a suitable charging circuit or element 11 capable of producing a still higher voltage. After the charging voltage builds up to about 21,000 volts, a rotary spark gap 12 discharges the capacitor in the charging circuit. This discharge takes place in about one microsecond and causes a magnetron oscillator in a radio transmitter 13 to oscillate for this brief period and send short pulses of radio frequency energy through a T-R box 14 to an antenna 15 which, for example, includes a wave guide on a parabolic reflector. Any suitable antenna arrangement can be used. Radio frequency pulses from the antenna (called "transmitted pulses" or "emitted pulses") strike one or more objects and produce reflections or echoes therefrom which are received by the antenna 15 and are transmitted through the T-R box 14 to the receiver 16. This receiver, as will be pointed out with greater particularity below, includes one or more tubes under gain control. The T-R box is of any desirable type, for example that employing a Western Electric Company 709-A tube in a resonant cavity. This tube is filled with an ionizable gas and has a small gap therein. During reception of the low voltages of the received energy the gas is not ionized, the cavity is tuned to resonance and the received energy is applied to the receiver 16. During the transmission of a pulse from the radio transmitter 13, the voltage due to the pulse ionizes the gas, thus detuning the cavity and substantially preventing the energy of the pulse from reaching the receiver 16. In the receiver 16, the received waves are heterodyned to a convenient intermediate frequency and these intermediate frequency waves are amplified, detected, amplified again and applied to one of the vertical deflecting plates 17 of a cathode ray oscilloscope 18. The received waves cause, for example, a sharp upward deflection of the trace of the cathode ray beam generated in the tube 18. The time relation of the transmitted pulses 110 to the corresponding received echoes 111 is shown in Fig. 5—A. A typical trace of an arrangement employing sweep expansion but not employing the gain intensification arrangement of this invention is shown in Fig. 2 while Fig. 3 shows a typical trace where such gain intensification during a period of timing scale expansion is employed. The traces of Figs. 2 and 3 will be referred to in greater detail below.

Energy from the rotary spark gap 12 (which is in the nature of a synchronizing pulse) controls the sweep circuit 19 which, by means of the connections 20 and 21 to the deflecting plates 22, causes the cathode ray beam to sweep across the screen 30 once per synchronizing pulse. Energy from the rotary spark gap is also fed into a variable delay circuit or unit 23 (the range unit) which produces a sharp pulse 112 a controllable period of time after the initiation of each pulse in the rotary spark gap. A suitable range unit is disclosed in an application of L. A. Meacham, Serial No. 491,791, filed June 22, 1943, and which issued as a Patent 2,422,204 on June 17, 1947, or in an article entitled "The SCR-584 Radar" in the February 1946 issue of "Electronics," beginning on page 110. The output pulse from the circuit 23 which is shown in Fig. 5—B is fed to an "expansion notch" generator 24 which produces a negative pulse 115 which has a duration corresponding for example to a range of 1200 yards. This pulse is shown in Fig. 5—E. This duration is also indicated in Figs. 2 and 3, these figures showing the position of this expansion notch with respect to the transmitted pulse the visual indication of which is represented by the pulses 110. Any suitable circuit for producing such a pulse can be used. Merely by way of example, a suitable circuit for producing such an expansion notch is disclosed in an application of B. M. Oliver, Serial No. 486,780, filed May 13, 1943 and which issued as Patent 2,433,863 on January 6, 1948. This pulse is applied to the sweep circuit 19 to make a controllable portion of the sweep voltage wave produced by the sweep circuit of a greater voltage gradient than the rest of the wave and thus to expand in the direction of the sweep the pattern on the oscilloscope screen for a distance corresponding to the length of this pulse. A portion of the energy from the sweep circuit 19 is also applied by means of the connection 25 to an unblanking circuit 26 to release the beam, which has been previously blanked off for a period of about 600 microseconds, for example, after the initiation of each pulse from the rotary spark gap 12.

The pulse from the variable delay circuit 23 is also connected through a delay circuit 27 which "delays" the pulse for a period corresponding to about 400 yards range by producing a pulse 113 (shown in Fig. 5—C) which is delayed from the pulse 112 by a period corresponding to a range of 400 yards. A suitable delay circuit is disclosed in the above-identified Oliver patent or in Patent 2,226,706, issued December 31, 1940, to M. Cawein. The "delayed" pulse is applied to a pulse generator 28 (called the "400-yard notch generator") which is, for example, similar to the expansion notch generator 24 except for some differences in circuit constants. This circuit generates, as shown in Fig. 5—D, a pulse 114 of a duration corresponding approximately to 400 yards range and in the position indicated by the notch 114 in Figs. 2, 3 and 5—D. If desired, the circuit elements 27 and 28 which generate the notch represented by the negative pulse 114 can be omitted. The output of the generator 28 is connected to the other one of the deflecting plates 17 in such a way that the energy of the notch pulse is algebraically added to the energy from the receiver 16 so that an echo pulse 111A appears in the notch 114 in the image on the oscilloscope screen in a manner shown in Figs. 2 and 3 and in Fig. 5—F. Other echoes which are not within the notch are represented by the pulse 111 in Figs.

2 and 3 and Fig. 5—F. It will be appreciated that Fig. 3 is merely a simplified showing of the pattern shown in Fig. 5—F.

Energy from the expansion notch generator 24 is amplified in the intensifier circuit 29 and applied as a negative pulse to the cathode 31 of the oscilloscope 18 to increase the intensity of the beam for the duration of each pulse from the generator 24.

The various elements of the system of Fig. 1 briefly referred to up to this point will not be further described inasmuch as all of these elements and circuits are similar to corresponding elements and circuits in the system shown and described in the above-mentioned Jeanne patent.

A positive pulse corresponding in time to the expansion notch 115 is taken from the notch generator 24 either directly or through a suitable phase inverter circuit (not shown) and applied by means of the connection 32 to the receiver 16 in order to control the gain thereof for the duration of the expansion notch or, in other words, to control the gain of the receiver during the period of time that the timing scale produced by the sweep circuit 19 is being expanded. This invention is not limited to any particular way of intensifying the gain by means of the control pulse but the usual gain control circuits are in general not satisfactory since they are usually arranged to change the gain gradually over a relatively long period of time rather than abruptly as in the present arrangement. Thus the gain control circuit must be capable of rapidly intensifying the gain upon the application of the leading edge of the expansion notch pulse to the receiver and rapidly decreasing the gain again upon the termination of the expansion notch pulse. A suitable gain-controlled section of the receiver 16 is schematically shown in Fig. 4.

In Fig. 4, the variable-mu tube 40 represents one stage of the receiver amplifier to which input signals are applied between grid and cathode by means, for example, of a transformer 41. Also connected in the circuit between the cathode and the control element of the tube 40 is a condenser 42 of relatively small capacity so that the charge thereacross can be very quickly varied. The anode-cathode circuit of the tube 40 includes an anode resistor 43 and a source of direct potential schematically represented by the battery 44. The positive replica of the expansion notch pulse 115 shown in Fig. 5—E is applied through the resistor 45 from the output circuit of the expansion notch generator 24 or of a phase inverter tube (which output circuit is shown schematically at the left of line 4—4 in Fig. 4) to one terminal of the condenser 42 the other terminal of which is connected, for example, to ground, either directly or through suitable biasing means (not shown). When the positive replica of the pulse 115 is applied to the condenser 42, the leading edge of this positive pulse causes the ungrounded side of the condenser 42 to rapidly increase in potential (because the condenser 42 and the resistance in series therewith have a relatively short time constant) thus varying the grid-cathode potential of the variable-mu tube 40 in the positive direction and increasing the gain of this tube. At the termination of the pulse the potential of the ungrounded terminal of the condenser 42 is quickly lowered and it discharges through the resistance 45 and the output circuit of the expansion notch generator 24 one terminal of which is connected to ground. Were the condenser 42 of the relatively high capacity employed in the usual gain control circuit, it would charge and discharge so slowly that the gain could not be increased and decreased quickly enough to operate satisfactorily in the arrangement described above.

It will be apparent that by making use of the circuit arrangement described above, the linear time scale is expanded during the bracketed interval shown in Figs 2 and 3 and during this same interval the height of the signal image is greatly increased due to the gain control arrangement of Fig. 4 or other suitable means. This makes it possible to more clearly distinguish the selected echo signal 111A from the other echoes 111 and from the background noise pattern. This arrangement provides an alternative to a pedestal pulse for making part of a trace stand out with respect to the rest. With the circuit arrangement shown, a negative notch pulse can be used without causing the top part of the corresponding portion of the trace to appear below that of the rest of the trace. The position of this expansion interval shown in Figs. 2 and 3 with respect to the transmitted pulse 110 can be varied by varying the time of generation of the output pulse 112 of the range unit 23. Thus if the range unit pulse is generated after a shorter time interval following the corresponding pulse 110 than that shown in the diagrams, the period of expanded sweep shown in Figs. 2, 3 and 5—F moves to the left as does also the 400 yard notch pulse 114 which is always centered within the period of the expanded sweep. The reverse is true for a longer time interval. The pulse 114 is centered with respect to the selected echo 111 either by manual means or by any suitable automatic means.

While the present invention has been described in terms of a preferred illustrative embodiment, it will be realized that the invention and its several features are susceptible of embodiment in a wide variety of other forms and hence the invention is to be understood as comprehending such other forms as may fairly come within the spirit and letter of the claims.

What is claimed is:

1. A cathode ray tube arrangement comprising means for generating a beam of electrons, a screen or target for said beam, a first means for deflecting said beam, means for applying a cyclically recurring deflecting wave to one of said deflecting means for sweeping said beam across said screen, each cycle of said wave having a sweeping portion and a flyback portion, said wave having its rate of change of amplitude in one certain part of the sweeping portion thereof higher than in any other part of said sweeping portion, a second deflecting means for deflecting said beam in a direction at right angles to that produced by said first deflecting means, means for applying a signal to said second deflecting means, means for increasing the gain of the signal, means for generating a pulse of the duration of said certain part of the sweeping portion of the deflecting wave, and means for applying said pulse to said gain increasing means to control the operation thereof during said certain part of the deflecting wave.

2. A cathode ray tube arrangement comprising means for generating a beam of electrons, a screen or target for said beam, a first means for deflecting said beam, means for applying a cyclically recurring deflecting wave to one of said deflecting means for sweeping said beam across said screen, each cycle of said wave having a sweeping portion and a flyback portion, said wave having its rate of change of amplitude in one certain part of the sweeping portion thereof higher than in any other part of said sweeping portion, a second deflecting means for deflecting said beam in a direction at right angles to that produced by said first deflecting means, means for applying a signal to said second deflecting means, means for increasing the gain of the signal, means for generating a pulse of the duration of said certain part of the sweeping portion of the deflecting wave, means for applying said pulse to said gain increasing means to control the operation thereof during said certain part of the deflecting wave, and means for intensifying said beam of electrons for the duration of said pulse.

3. A cathode ray tube arrangement comprising means for generating a beam of electrons, a screen or target for said beam, a first means for deflecting said beam, means for applying a cyclically recurring deflecting wave to one of said deflecting means for sweeping said beam across said screen, each cycle of said wave having a sweeping portion and a flyback portion, said wave having its rate of change of amplitude in one part of the sweeping portion thereof higher than in any other part of said sweeping portion, a second deflecting means for deflecting said beam in a direction at right angles to that produced by said first deflecting means, means for applying a signal to said second deflecting means, and means for increasing the gain of the signal appearing during the said period when the sweeping portion of said deflecting wave has its higher rate of change of amplitude, said last-mentioned means comprising a variable-mu tube through which said signal is passed and means for varying the gain of said tube during said period of higher rate of change of amplitude.

4. The combination of elements as in claim 1 in further combination with means for varying the position of the period of said higher rate of change of amplitude in the deflecting wave cycle.

HUGH S. WERTZ.

REFERENCES CITED

The following references are of record in the file of this patent:

UNITED STATES PATENTS

| Number | Name | Date |
|---|---|---|
| 2,313,967 | Read | Mar. 16, 1943 |
| 2,399,754 | Miller | May 7, 1946 |
| 2,416,320 | Jeanne | Feb. 25, 1947 |
| 2,419,620 | Young | Apr. 29, 1947 |